United States Patent [19]

Turner

[11] 4,089,938
[45] May 16, 1978

[54] PROCESS FOR RECOVERING OXYGEN FROM AIR

[75] Inventor: Nelson C. Turner, Houston, Tex.

[73] Assignee: Hudson Engineering Corporation, Houston, Tex.

[21] Appl. No.: 815,983

[22] Filed: Jul. 15, 1977

[51] Int. Cl.² ............................................. C01B 13/08
[52] U.S. Cl. ..................................... 423/579; 252/372
[58] Field of Search ...................... 423/579; 252/372; 48/206

[56] References Cited

U.S. PATENT DOCUMENTS

| | | | |
|---|---|---|---|
| 70,705 | 11/1867 | Du Motay | 423/579 |
| 86,248 | 1/1869 | Phillips | 423/579 |
| 588,617 | 8/1897 | Stuart | 423/579 |
| 1,124,304 | 1/1915 | Danckwardt | 423/579 |
| 2,421,381 | 6/1947 | Jenness | 423/579 |

*Primary Examiner*—Edward J. Meros

[57] ABSTRACT

A process is provided for recovering oxygen from air and particularly providing a product stream comprising a mixture of oxygen and steam useful, for example, in coal gasification processes. The instant process involves contacting a suspension of manganese dioxide in an aqueous solution of sodium or potassium hydroxide with air in a low pressure absorbing zone. The resulting liquid oxygen enriched stream is then pumped into a relatively high pressure generating zone where it is contacted with steam to release oxygen absorbed in the absorbing zone and thereby provide the above mentioned product.

4 Claims, 1 Drawing Figure

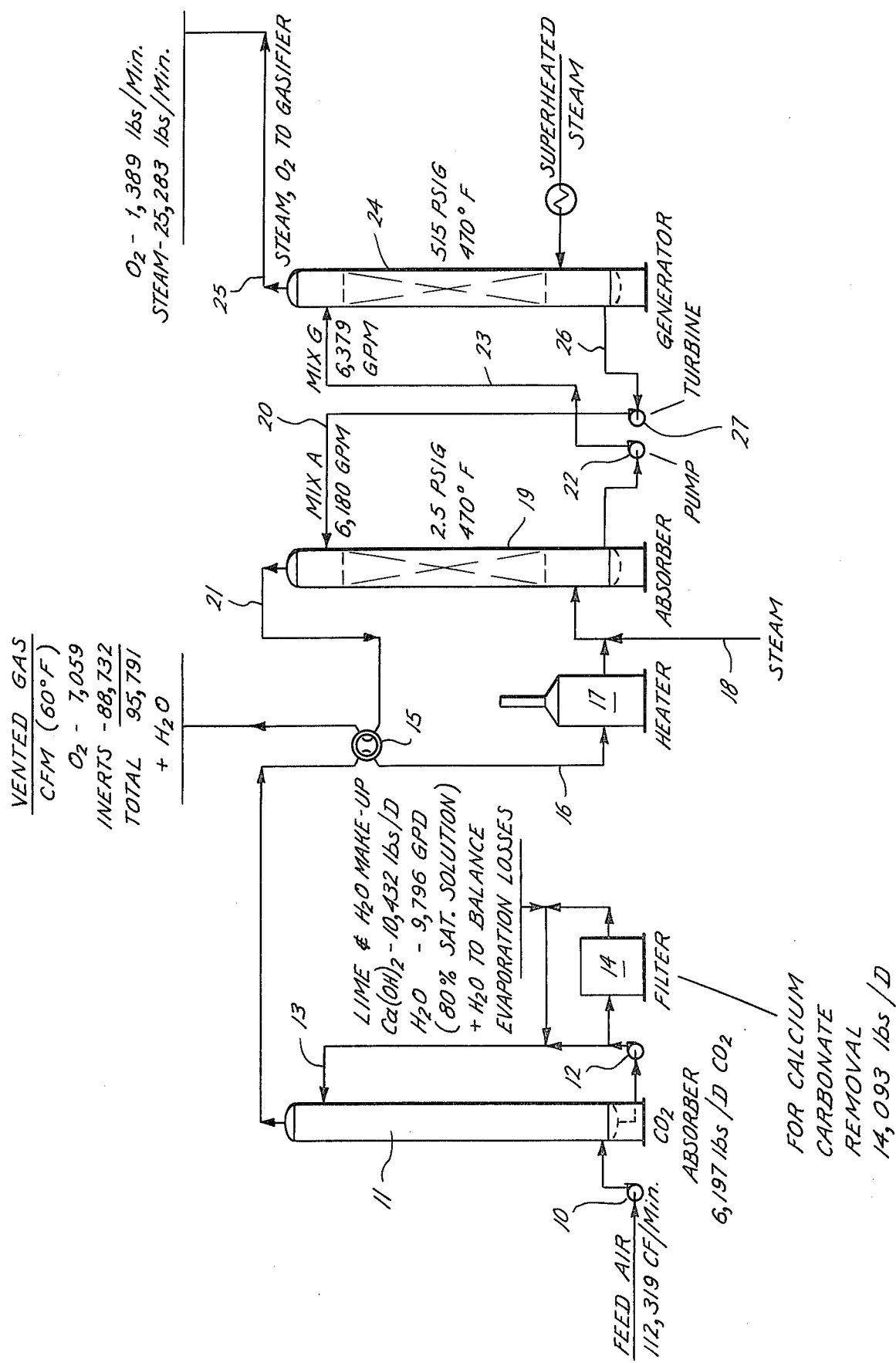

PROCESS FOR RECOVERING OXYGEN FROM AIR

This invention relates to a novel chemical process for extracting or recovering oxygen from the atmosphere. In one of its aspects, it relates to such a process which provides an oxygen-steam product suitable for use as such in various chemical processes such as the gasification of coal.

The production of relatively pure oxygen on a large scale is typically carried out today by liquifaction of air. Since this liquifaction process requires that thermal energy first be converted into mechanical energy, it is very energy intensive. Also, since extensive compressor systems are involved, the initial capital investment is relatively high. A chemical process using substantially only thermal energy and avoiding any substantial compression of the air from which oxygen is to be recovered could be quite attractive. Such a process generating a mixture of oxygen and steam could find substantial application in coal gasification processes. Such processes are being extensively researched and of the five leading processes which are in advanced study, four require high purity oxygen in order to make pipeline quality synthetic gas. Air as such cannot be used because the extensive amount of nitrogen present would dilute the final gas product so as to make it unacceptable.

Various chemical processes for recovering oxygen from air have been suggested. For example, the process of DuMotay and Marechel, as disclosed in U.S. Patent No. 70,705 of November 12, 1867, has been suggested for such purpose. The process of DuMotay et al is performed by alternately passing air and steam through a closed retort over a hot alkali manganate having the ability to be oxidized by the passage of air thereover, and thereafter to be deoxidized and release gaseous oxygen during the passage of steam thereover. The reversible reaction theoretically is:

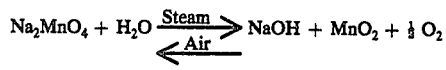

The basic process of DuMotay et al has not been commercially successful because of several disadvantages rendering the process economically unprofitable.

Danckwardt, in his U.S. Pat. No. 1,124,304, issued Jan. 12, 1915, suggests an improved DuMotay type of process. The improved process employs a large excess of alkali as a diluent for the manganese reactants so that the whole mass becomes fluid. The resultant fluidity is supposed to permit accelerated reactions as well as movement of the molten mass by gravitational action from one retort to another to thereby permit a continuous process. However, the Danckwardt process is subject to several disadvantages. For example, it proposes to use temperatures of the order of 500° C. Also, both retorts must inherently operate at substantially the same pressure which is essentially slightly above atmospheric.

As indicated above, a mixture of steam and oxygen is useful in various processes such as coal gasification. Such processes usually employ the steam and oxygen at elevated pressures, e.g. 500 psi. It would be desirable to have a process which could produce a mixture of oxygen and steam at an elevated pressure without substantial compression of either the air initially used in the process or the output oxygen-steam mixture.

It is accordingly an object of this invention to provide a process of DuMotay type wherein the effluent oxygen-steam mixture can be provided at a substantially elevated pressure without any substantial pre-compression of the air to be fed to the oxidation step.

Another object is to provide such a process wherein the manganese dioxide is oxidized with air at essentially atmospheric pressure so as to avoid compressing the air and then the oxidized product in the form of a liquid or slurry, is pumped into a high pressure deoxidizing zone so that the oxygen-steam effluent from the latter zone is at the desired elevated pressure.

These and other objects, advantages and features of the invention will be apparent to those skilled in the art upon consideration of the specification and accompanying drawing which is a flow sheet illustrating a preferred embodiment of the process of this invention.

Referring to the drawing, feed air at atmospheric pressure passes to blower 10 and thence into carbon dioxide absorber 11 where it is scrubbed with lime water to remove carbon dioxide as calcium carbonate. Thus pump 12 circulates a mixture of water and lime via line 13 to the top of the carbon dioxide absorber for flow downwardly therein over suitable packing or other flow distribution devices and counter-current to the flow of the air. A suitable filter 14 can have a side stream of the effluent from pump 12 passed therethrough to remove precipitated calcium carbonate.

The resulting carbon dioxide free air passes through a heat exchanger 15 and line 16 to a heater 17 wherein it is heated to a temperature such that the heated air, plus any makeup steam injected through line 18, will cause the temperature within absorber 19 to be in the range of 400° to 550° F., preferably in the range of 450° to 500° F. After the air enters absorber 19, it flows upwardly and counter-currently to a descending mixture of essentially manganese dioxide, sodium or potassium hydroxide or a mixture thereof, and water passing through the absorber via line 20.

The pressure in absorber 19 does not substantially exceed atmospheric pressure and will, in any event, be less than about 50 psig. In fact, the pressure at the bottom of the absorber need be only sufficiently above atmospheric to cause the air to flow upwardly through the absorber and to cause the vent gas to flow through line 21 and heat exchanger 15 to atmosphere.

At any rate, the oxygen of the air reacts with the manganese dioxide to convert it to the manganate to thereby provide an oxygen rich stream in the bottom of the absorber.

In accordance with this invention, the oxygen enriched stream is pumped by pump 22 through line 23 into the generator 24. The arrangement is such that the oxygen enriched stream is boosted in pressure from essentially atmospheric to approximately that desired in the final oxygen-steam effluent. Accordingly, the pressure within generator 24 will be within the range of 150 to 1035 psig and more preferably, within the range of 300 to 600 psig. The temperature in the generator should be within the range of 350° to 550° F.

As the oxygen enriched stream flows downwardly in generator 24, it is contacted with steam sufficiently superheated to avoid substantially any condensation thereof in the generator. During this operation, at least a portion of the manganates formed in absorber 19 are converted to manganese dioxide with resultant release of elemental oxygen. This oxygen, along with the stripping steam, flows out through line 25, preferably directly to the process in which it is to be used. If desired, all or a part of the steam in line 25 can be condensed, as in a suitable heat exchanger, to provide an oxygen enriched stream or pure oxygen.

The oxygen depleted stream is flowed from the bottom of generator 24 via line 26 to a turbine 27 which drives pump 22. From the turbine it flows through line 20 and back to absorber 19 to complete the cycle.

While the specific chemical reactions involved in process of this invention are fundamentally old and while the concentration of various ingredients can vary, a typical example of concentrations is as follows (weight percent):

| INGREDIENT | MIX A | MIX G |
|---|---|---|
| $K_2MnO_4$ | 5.8 | 22.89 |
| $H_2O$ | 15.91 | 17.26 |
| KOH | 68.05 | 57.33 |
| $MnO_2$ | 10.24 | 2.52 |

As will be seen, the oxidation of the manganese dioxide to potassium manganate is not complete in the absorber and likewise the deoxidation of the manganate is not complete in the generator. Accordingly, there will normally be an unconverted portion of these two materials circulating in the various streams.

The amount of sodium or potassium hydroxide which is to be present in aqueous solution thereof should be an amount within the range of 60 to 95 weight percent. The amount of this solution to be used in suspending the manganese compounds should be such as to render the suspension pumpable under the conditions of the process. Also, the hydroxide should be present in molal excess with respect to the manganese dioxide and preferably about 2 mols of the hydroxide is used per mol of the manganese dioxide.

The invention having been described what is claimed is:

1. A process for producing a mixture consisting essentially of oxygen and steam comprising the steps of: contacting in an absorbing zone, a suspension of manganese dioxide in an aqueous solution of sodium or potassium hydroxide with air at a pressure not substantially exceeding atmospheric and at a temperature within the range of 400° to 550° F to provide an oxygen enriched stream; pumping said oxygen enriched stream into a generating zone maintained at a pressure within the range of 150 to 1035 psig and at a temperature within the range of 350° to 550° F, contacting said oxygen enriched stream while in said generating zone with steam to provide an oxygen depleted stream, said steam being sufficiently superheated to avoid substantially any condensation thereof in said generating zone; flowing said oxygen depleted stream back into said absorbing zone, and flowing a stream consisting essentially of oxygen and steam from said generating zone.

2. The process of claim 1, wherein said sodium or potassium hydroxide is present in said aqueous solution in an amount within the range of 60 to 95 weight percent.

3. The process of claim 2, wherein the temperature in the absorbing zone is within the range of 450° to 500° F.

4. The process of claim 3, wherein the pressure in the generating zone is within the range of 300 to 600 psig.

* * * * *